United States Patent
Lee et al.

(10) Patent No.: US 8,681,017 B2
(45) Date of Patent: Mar. 25, 2014

(54) VISIBLE LIGHT COMMUNICATION APPARATUS FOR VEHICLE, SYSTEM AND METHOD FOR VEHICULAR COMMUNICATION INSIDE TUNNEL USING VISIBLE LIGHT COMMUNICATION

(75) Inventors: Sang Yub Lee, Gyeonggi-do (KR); Hyo Sub Choi, Jeonbuk (KR); Chul Dong Lee, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 627 days.

(21) Appl. No.: 12/979,510

(22) Filed: Dec. 28, 2010

(65) Prior Publication Data

US 2011/0156925 A1 Jun. 30, 2011

(30) Foreign Application Priority Data

Dec. 28, 2009 (KR) ........................ 10-2009-0131808

(51) Int. Cl.
*G08G 1/09* (2006.01)

(52) U.S. Cl.
USPC .............. 340/905; 340/936; 340/942; 701/23

(58) Field of Classification Search
USPC ..................................... 340/905, 936; 701/23
See application file for complete search history.

(56) References Cited

U.S. PATENT DOCUMENTS

2007/0002873 A1 1/2007 Maekawa

FOREIGN PATENT DOCUMENTS

| JP | 2009-036571 A | 2/2009 |
|---|---|---|
| KR | 101998038066 | 4/2000 |
| KR | 1020010057753 | 11/2001 |
| KR | 10-2009-0051020 A | 5/2009 |

OTHER PUBLICATIONS

Korean Patent Office, Korean Office Action issued in corresponding KR Application No. 10-2009-0131808, dated Mar. 8, 2011.
English Abstract of Korean Patent Application No. 101998038066, filed Sep. 15, 1998.
English Abstract of Korean Patent Application No. 1020010057753, filed Sep. 14, 2001.

*Primary Examiner* — Daniel Wu
*Assistant Examiner* — Frederick Ott
(74) *Attorney, Agent, or Firm* — Sughrue Mion, PLLC

(57) ABSTRACT

A visible light communication apparatus for a vehicle is provided. The visible light communication apparatus for the vehicle includes a vehicle optical receiver for receiving a visible light signal including a tunnel light node ID, a front passing vehicle node ID, and tunnel environment data, from a tunnel light and converting the visible light signal to an electric signal; and a vehicular visible light emitting diode unit arranged to face the optical receiver for converting vehicle speed and location information calculated by counting tunnel light node IDs received over a certain time, to a visible light signal and sending the visible light signal to the tunnel light. Using the vehicular visible light communication apparatus and the tunnel light having the visible light communication function, an efficient vehicular communication system can be built in the tunnel.

24 Claims, 8 Drawing Sheets

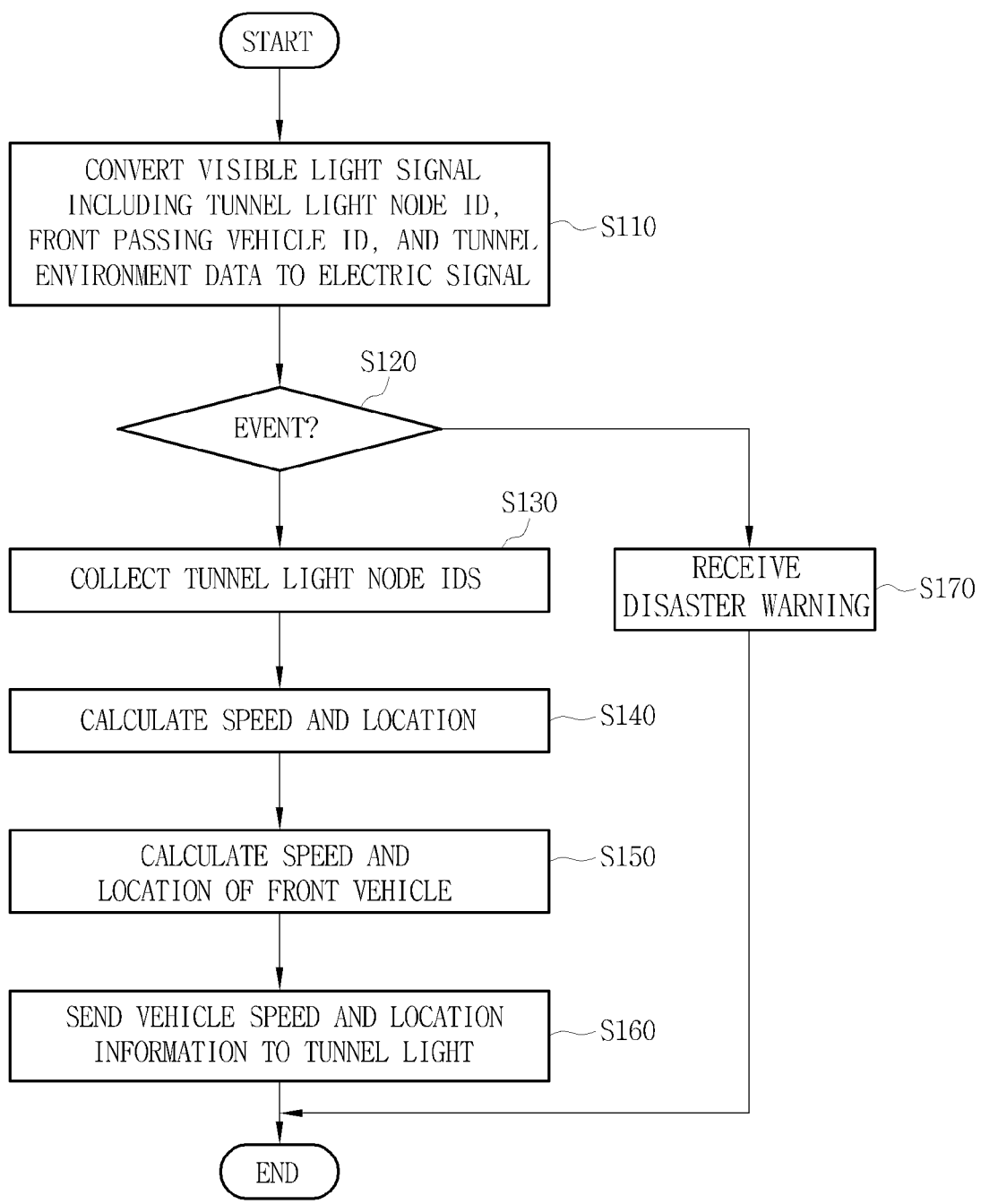

VISIBLE LIGHT COMMUNICATION APPARATUS FOR VEHICLE, SYSTEM AND METHOD FOR VEHICULAR COMMUNICATION INSIDE TUNNEL USING VISIBLE LIGHT COMMUNICATION

CROSS-REFERENCE TO RELATED APPLICATION

This application claims priority to Korean patent application filed in the Korean Intellectual Property Office on Dec. 28, 2009 and assigned Serial No. 10-2009-0131808, which is incorporated by reference in its entirety.

TECHNICAL FIELD OF THE INVENTION

The present invention relates generally to a visible light communication apparatus for a vehicle, a system and a method for vehicular communication in a tunnel using visible light communication. More particularly, the present invention relates to a visible light communication apparatus for a vehicle for more efficient vehicular communication in a tunnel using a tunnel light, a system and a method for vehicular communication in the tunnel using visible light communication.

BACKGROUND OF THE INVENTION

In general, a communication method between vehicles in a tunnel analyzes and adapt to radio channel characteristics per tunnel so as to prevent signal distortion and information loss according to the radio channel characteristics of the tunnel. That is, it is necessary to install a relay station inside the tunnel. It is common to model a communication channel in each section of the tunnel before the relay station is installed, and to install the relay station after the analysis is completed.

Using conventional radio communication, it is hard to handle disasters or accidents in terms of a tunnel system. When a frequency broadcast by a corresponding vehicular system is not monitored continuously, the accident in the tunnel is not recognized. Hence, a vehicle driver needs to monitor the corresponding frequency all the time. The conventional vehicular communication focuses on the accident information transfer function after the accident takes place, rather than the accident prevention function.

A conventional wireless system for the tunnel analyzes a tunnel environment, for example, channel conditions and then installs the relay station in accordance with the tunnel environment. Disadvantageously, when the tunnel is extended or altered, the installed relay station is unusable. In this case, it is burdensome to analyze the modified tunnel environment and to install a new relay station. In this regard, communication system and method for more efficiently sending information to the vehicle in the tunnel are demanded.

SUMMARY OF THE INVENTION

To address the above-discussed deficiencies of the prior art, it is a primary aspect of the present invention to provide a visible light communication apparatus for a vehicle, for efficient vehicular communication in a tunnel using a tunnel light including a visible light communication function.

Another aspect of the present invention is to provide a system and a method for vehicular communication in a tunnel using visible light communication, for efficient vehicular communication in a tunnel using a tunnel light including a visible light communication function.

According to one aspect of the present invention, a visible light communication apparatus for a vehicle includes a vehicle optical receiver for receiving a visible light signal including a tunnel light node ID, a front passing vehicle node ID, and tunnel environment data, from a tunnel light and converting the visible light signal to an electric signal; and a vehicular visible light emitting diode unit arranged to face the optical receiver for converting vehicle speed and location information calculated by counting tunnel light node IDs received over a certain time, to a visible light signal and sending the visible light signal to the tunnel light.

The tunnel environment data may include weather condition information including humidity and a temperature in the tunnel, and disaster information and car accident information inside or outside the tunnel.

The vehicle optical receiver and the vehicular visible light emitting diode unit may be installed in a side or an upper side of the vehicle to correspond to arrangement of the tunnel light.

The visible light communication apparatus may further include a demodulator for demodulating the electric signal converted at the vehicle optical receiver; a node counter for collecting the tunnel light node IDs from the demodulator and calculating the vehicle speed and location by counting the received tunnel light node IDs; an error corrector for correcting the vehicle speed and location affected by error of the tunnel light; and a modulator for modulating the vehicle speed and location information to the visible light signal to send the visible light signal.

The node counter may collect the front passing vehicle node ID from the demodulator and calculate front passing vehicle speed and location by counting the received tunnel light node IDs.

The visible light communication apparatus may further include a display for displaying the vehicle speed and the location and the tunnel environment data. The display may be a navigation device.

The vehicle optical receiver may include a plurality of photo-detector arrays spaced apart by a certain distance and arranged in a row, and visible light emitting diodes of the vehicular visible light emitting diode unit may be arranged in a row facing the photo-detectors.

When there exists an event including a car accident inside or outside the tunnel according to the tunnel environment data, a disaster warning may be received from the tunnel light.

According to another aspect of the present invention, a vehicular communication system in a tunnel using visible light communication may further include a controller for, when determining an event including a car accident inside or outside the tunnel based on tunnel environment data, controlling to receive a disaster warning from a tunnel light.

The vehicular communication system may include a tunnel light apparatus including a transmit tunnel light which sends a tunnel light node ID, a front passing vehicle node ID, and tunnel environment data to a vehicular visible light communication apparatus installed to a vehicle entering the tunnel using the visible light communication, and a receive tunnel light which receives a vehicle node ID and vehicle speed and location information from the vehicular visible light communication apparatus; and a tunnel light control apparatus for assigning an ID corresponding to the tunnel light, receiving the vehicle speed and location information from the receive tunnel light, and sending the vehicle speed and location information to the transmit tunnel light.

The transmit tunnel light may include a modulator for modulating the tunnel light node ID, the front passing vehicle node ID, and the tunnel environment data to send a visible light signal; and a tunnel light visible light emitting diode unit for converting the modulated tunnel light node ID, front passing vehicle node ID, and tunnel environment data to a visible light signal and sending the visible light signal to the vehicular visible light communication apparatus.

The receive tunnel light may include a tunnel light optical receiver for receiving a visible light signal including a vehicle ID from the vehicle and converting the visible light signal to an electric signal; and a demodulator for demodulating the electric signal converted at the optical receiver.

The tunnel light optical receiver may include a plurality of photo-detector arrays spaced apart by a certain distance and arranged in a row, and visible light emitting diodes of the vehicular visible light emitting diode unit may be arranged in a row facing the photo-detectors.

The tunnel light control apparatus may include a data server for storing the tunnel light node ID, the front passing vehicle node ID, and the tunnel environment data; and a controller for controlling to send the data stored to the data server to the vehicular visible light communication apparatus using the tunnel light.

The tunnel light control apparatus may further include a sensor for generating the tunnel environment data by detecting smoke, humidity, and temperature inside and outside the tunnel.

The vehicular communication system may further include a display installed at a tunnel entrance or exit for displaying the tunnel environment data.

According to yet another aspect of the present invention, a vehicular communication method in a tunnel using visible light communication includes receiving a visible light signal including a tunnel light node ID, a front passing vehicle node ID, and tunnel environment data from a tunnel light and converting the visible light signal to an electric signal; collecting the tunnel light node IDs by demodulating the electric signal; calculating vehicle speed and location by counting the received tunnel light node IDs; and converting the calculated vehicle speed and location information to a visible light signal and sending the visible light signal to the tunnel light.

The calculating of the vehicle speed and location may include collecting the front passing vehicle node ID from the demodulated signal and calculating speed and location of the front passing vehicle by counting the tunnel light node IDs received over a certain time.

The collecting of the tunnel light node IDs may include sending the vehicle node ID to the tunnel light.

The vehicular communication method may further include when there exists an event including a car accident inside or outside the tunnel according to the tunnel environment data, receiving a disaster warning from the tunnel light.

According to still another aspect of the present invention, a vehicular communication method in a tunnel using visible light communication includes assigning tunnel light node IDs to tunnel lights; determining whether there exists an event including a car accident occurring inside or outside the tunnel, based on tunnel environment data; when there is no event according to the determination, sending a tunnel light node ID, a front passing vehicle node ID, and the tunnel environment data to a vehicular visible light communication apparatus of a vehicle which enters the tunnel using the visible light communication; receiving a vehicle node ID and vehicle speed and location information from the vehicular visible light communication apparatus; and sending the vehicle speed and location information to a vehicular visible light communication apparatus of a front vehicle or a rear vehicle using the visible light communication.

The vehicular communication method may further include sending the vehicle node ID and the vehicle speed and location information received at a receive tunnel light, to a tunnel light control apparatus; and sending the vehicle node ID and the vehicle speed and location information to a transmit tunnel light.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 is a flowchart of a vehicular communication method in the tunnel using the visible light communication according to an exemplary embodiment of the present invention.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged vehicular communication system.

Figure 1A:
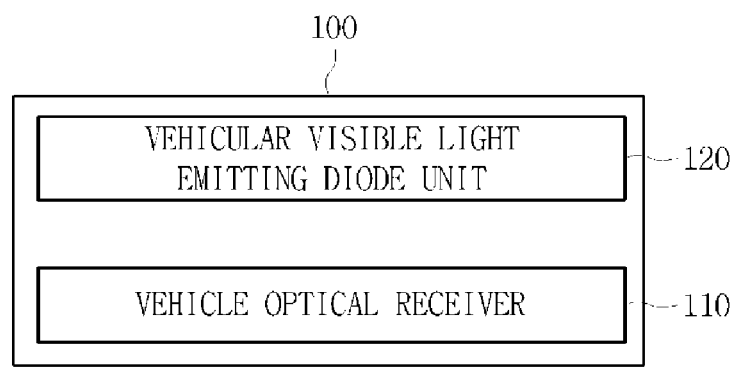
FIG. 1A is a simplified block diagram of a visible light communication apparatus for a vehicle according to an exemplary embodiment of the present invention.

FIG. 1A is a simplified block diagram of a visible light communication apparatus for a vehicle according to an exemplary embodiment of the present invention. Referring to FIG. 1A, the vehicular visible light communication apparatus 100 includes a vehicle optical receiver 110 and a vehicular visible light emitting diode unit 120.

The vehicle optical receiver 110 receives and converts a visible light signal to an electric signal. The vehicle optical receiver 110 can employ a photo-detector. The visible light signal includes a tunnel light node ID, a front passing vehicle node ID, and tunnel environment data.

The tunnel lights are arranged at regular intervals with respect to a total length of the tunnel, and assigned identification (ID) for identifying the tunnel lights. Thus, the tunnel light communicating with the vehicle can be identified with the ID. The tunnel light node ID is used to acquire the arrangement order of the tunnel lights from the tunnel entrance, and to locate the vehicle in the tunnel or to estimate a speed of the vehicle.

The vehicle optical receiver 110 receives the front passing vehicle node ID and calculates the speed and the location of the front vehicle as well as its current speed and location, thus preventing a car accident caused by the abrupt speed change of the front vehicle. The vehicle optical receiver 110 receives the tunnel environment data which includes weather conditions inside the tunnel including the humidity and the temperature in the tunnel, disaster information inside or outside the tunnel, and car accident information. The tunnel environment data can be displayed in a display in the vehicle for the normal vehicle running in the tunnel.

The vehicular visible light emitting diode unit 120 includes one or more LEDs for converting the current speed and location information of the vehicle to a visible light signal and sending the visible light signal to the tunnel light. The vehicular visible light emitting diode unit 120 sends the vehicle speed and location information calculated by the vehicle optical receiver 110 to the tunnel light using the tunnel light node ID.

Figure 1B:
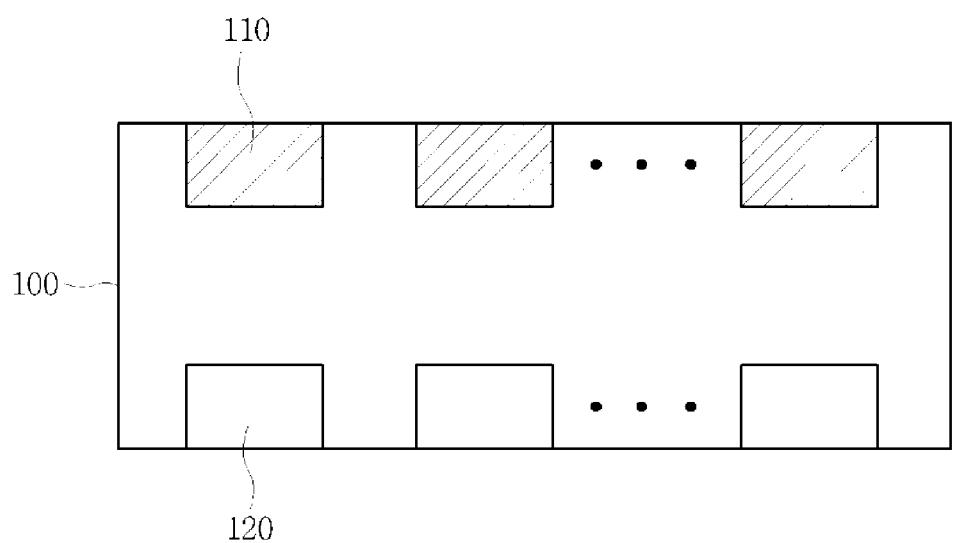
FIG. 1B is a diagram of arrangement of a vehicle optical receiver and a vehicular visible light emitting diode of FIG. 1A.

FIG. 1B depicts arrangement of the vehicle optical receiver and the vehicular visible light emitting diode unit of the vehicular visible light communication apparatus of FIG. 1A. To reduce interference caused by the arrangement, the vehicle optical receiver 110 and the vehicular visible light emitting diode unit 120 can be arranged to face each other. In the visible light communication, the greatest determinant of the transmission and reception performance is an effective area of the light. Accordingly, it is advantageous that the arrangement of the vehicle optical receiver 110 and the vehicular visible light emitting diode unit 120 of the vehicular visible light communication apparatus 100 is identical to the arrangement of the tunnel light sending the visible light in terms of the communication efficiency.

Figure 2A:
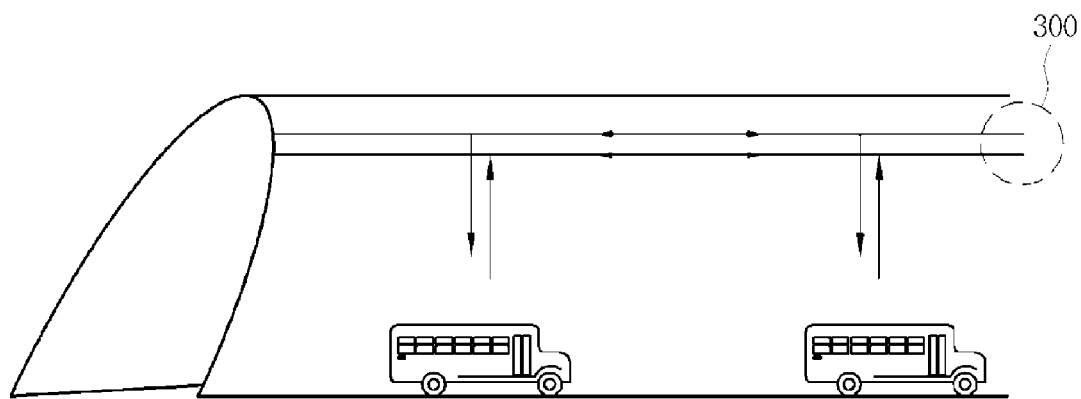
FIG. 2A is a simplified diagram of communication between tunnel lights and a vehicle in a tunnel.
Figure 2B:
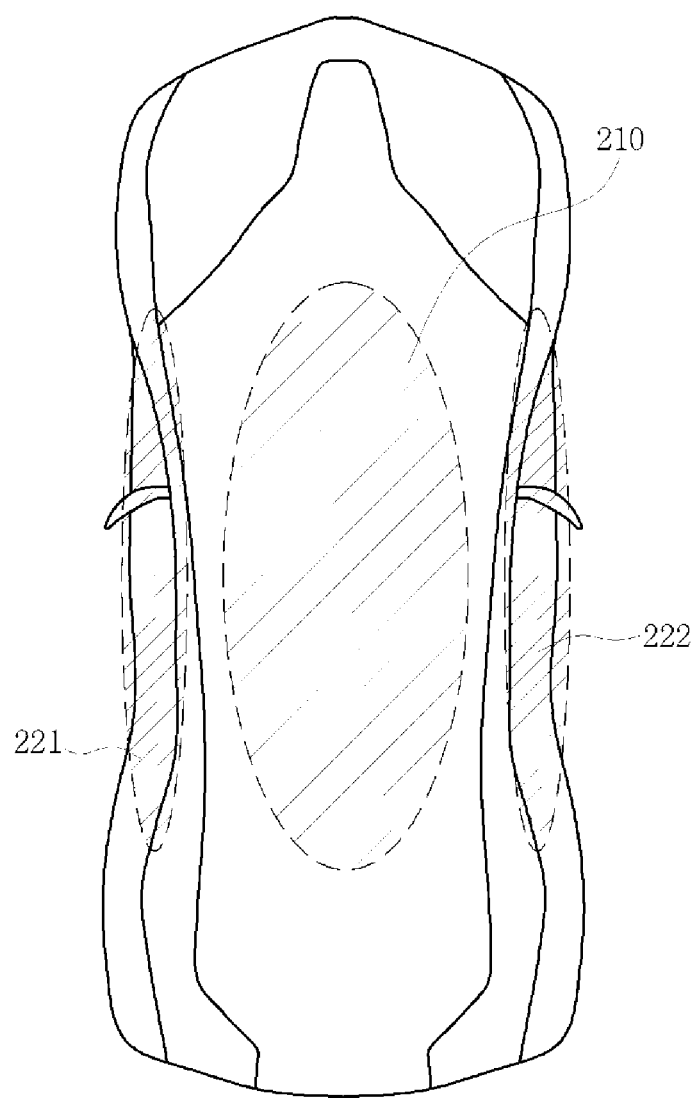
FIG. 2B is a diagram of the vehicular visible light communication apparatus of FIG. 1B installed in the vehicle.
Figure 2C:
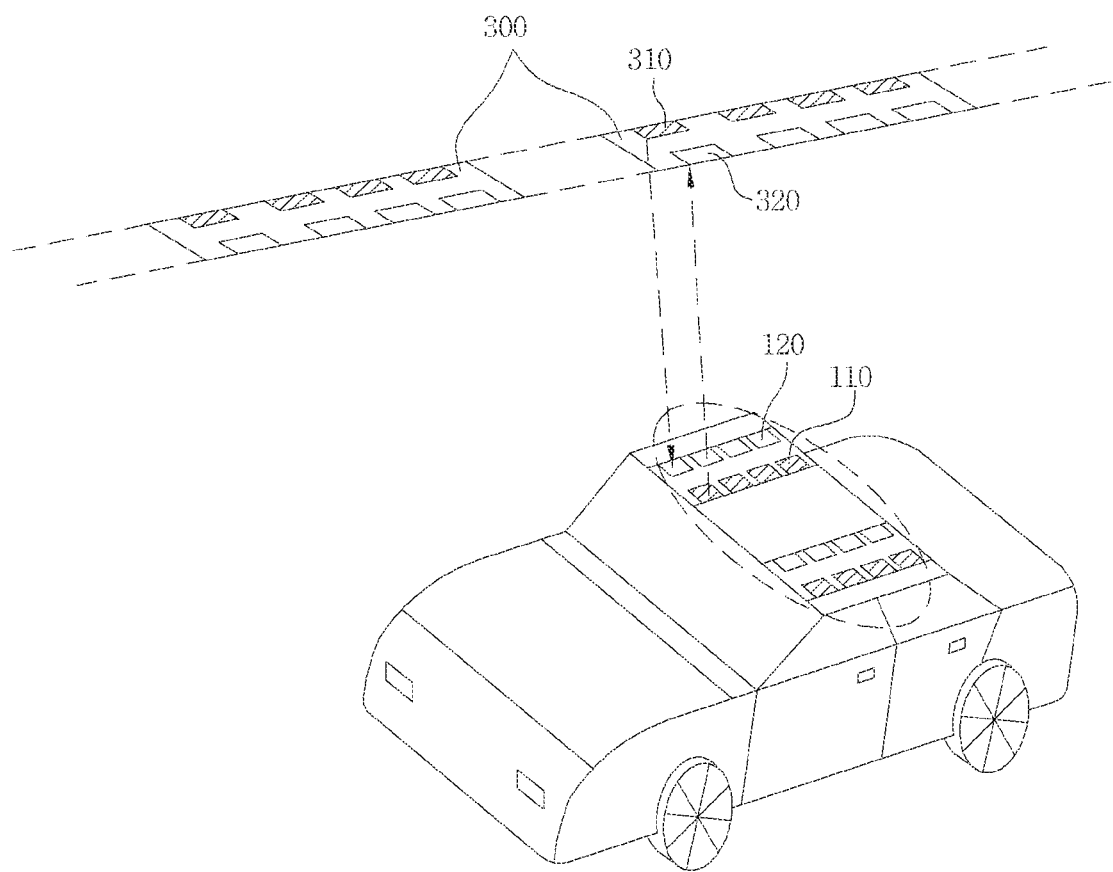
FIG. 2C is a simplified diagram of communication between the vehicular visible light communication apparatus of FIG. 1A and the tunnel lights.

FIG. 2A is a simplified diagram of communication between the tunnel light and the vehicle in the tunnel, and FIG. 2B is a simplified diagram of the vehicular visible light communication apparatus of FIG. 1B installed in the vehicle, and FIG. 2C is a simplified diagram of communication between the vehicular visible light communication apparatus of FIG. 1A and the tunnel light.

The tunnel light apparatus 300 of FIG. 2A is disposed in the tunnel ceiling which is vertically above the vehicle driving on the road in the tunnel, for performing the visible light communication with the vehicle. Besides the tunnel ceiling, the tunnel light can be installed in both sides of the tunnel to vertically face side windows of the vehicle. Based on the shape of the tunnel, the tunnel lights can be installed in center arrangement, zigzag arrangement, and symmetric arrangement. An optimum arrangement can be determined by considering light distribution of the lighting equipment, luminance distribution of the road, flicker, lamps, and repair of the lighting equipment. For the smooth transmission and reception with the vehicle in the tunnel, it is preferred to install the vehicular visible light communication apparatus in the side or the upper side of the vehicle as shown in FIG. 2B.

Referring to FIG. 2C, the vehicle optical receiver 110 and the visible light emitting diode unit 120 of the vehicular visible light communication apparatus 100 can be installed in a certain part of the vehicle to correspond to a tunnel light optical receiver 310 and a tunnel light visible light emitting diode 320 of the tunnel light 300 installed on the tunnel ceiling. As the vehicular visible light communication apparatus 100 is installed as such, the communication efficiency can be enhanced by expanding the effective area of the visible light emitting from the tunnel light.

Figure 3:
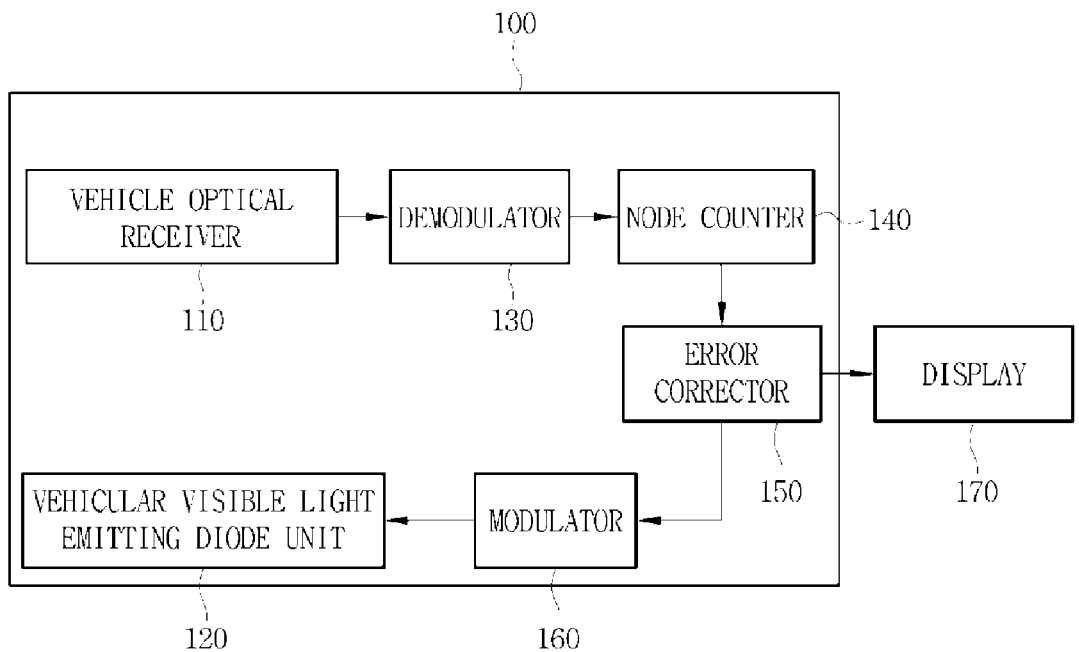
FIG. 3 is a block diagram of the vehicular visible light communication apparatus of FIG. 1A.

FIG. 3 is a block diagram of the vehicular visible light communication apparatus of FIG. 1A. The vehicular visible light communication apparatus 100 of FIG. 3 includes the vehicle optical receiver 110, the vehicular visible light emitting diode unit 120, a demodulator 130, a node counter 140, an error corrector 150, and a modulator 160.

The vehicle optical receiver 110 receives the visible light signal from the tunnel light and converts the visible light signal to the electric signal as stated above. The vehicle optical receiver 110 can employ a photoelectric conversion element, such as photo-diode, mostly used to detect optical signals.

The demodulator 130 demodulates the converted electric signal according to various demodulation schemes for the visible light communication. The demodulation scheme can be the same as a modulation scheme to be explained.

The node counter 140 confirms the light node ID sent from the tunnel light based on the signal demodulated at the demodulator 130. Using the number of the light node IDs received when the vehicle passes through the tunnel, the node counter 140 calculates the vehicle speed and location. To calculate the speed, distance information between a first tunnel light and a second tunnel light can be provided from the tunnel light. A tunnel light control apparatus which controls the tunnel lights provides the distance between the tunnel lights to the tunnel light.

The error corrector 150 corrects error caused by abnormality of the tunnel light so as to calculate the speed and the location of the vehicular visible light communication apparatus 100. In case of the abnormality of the tunnel light when the light is turned off or out of order or when the light node ID is not sent to the vehicular visible light communication apparatus 100, the error corrector 150 compensates for the vehicle speed and location by estimating the omitted node number. For example, upon entering the tunnel, the vehicle receives the tunnel light node ID from the tunnel light. When the distance between the tunnel lights is 10 m and the provided number of the tunnel light node IDs is 10, the vehicle moves 900 m over a certain time. However, when no receiving the tunnel light node ID of the fifth tunnel light, which is broken, from the tunnel entrance, the error corrector 150 can assume the reception of 11 IDs in total by adding the fifth tunnel light node ID and thus calculate the travel distance of the vehicle. By virtue of the correction of the error corrector 150, the accurate vehicle speed and location in the tunnel can be acquired and accidents can be prevented in advance.

The modulator 160 modulates the vehicle location and speed data calculated through the node counter 140 and the error corrector 150, to a visible light signal and outputs the visible light signal to the vehicular visible light emitting diode unit 120. According to various modulation schemes, the modulator 160 loads and modulates the vehicle location and speed data signal over a carrier frequency which is a particular frequency band. The speed and location data can be modulated using at least one of the various modulation schemes, for example, using at least one of OOK (On Off Keying), PWM (Pulse Width Modulation), PPM (Pulse Position Modulation), PAM (Pulse Amplitude Modulation), ASK (Amplitude Shift Keying), M-PSK (M-ary Phase Shift Keying), and M-QAM (M-ary Quadrature Amplitude Modulation).

The visible light emitting diode unit 120 includes one or more LEDs for converting the modulated electric signal to the visible light signal and sending the visible light signal.

The vehicular visible light communication apparatus 100 can receive a disaster warning from the tunnel light control apparatus. The disaster warning can be displayed through the display, for example, through a navigation system. The vehicle driver can activate a disaster prevention system of the vehicle. When the vehicle is equipped with a Controller Area Network (CAN) system, the vehicle driver can cope with the disaster warning by controlling measurement and control equipments in the vehicle in conjunction with the CAN system.

Figure 4A:
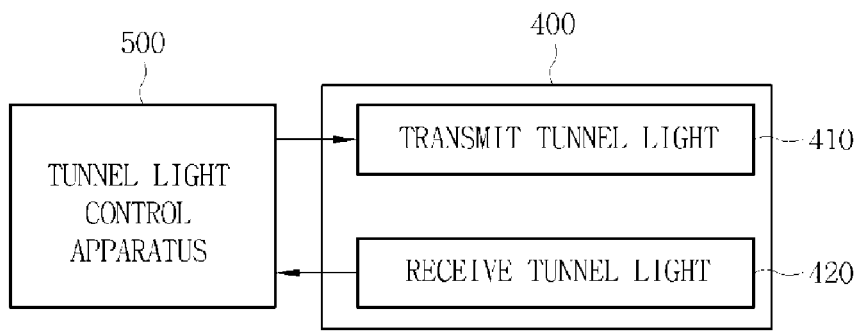
FIG. 4A is a block diagram of a vehicular communication system in the tunnel using visible light communication according to an exemplary embodiment of the present invention.
Figure 4B:
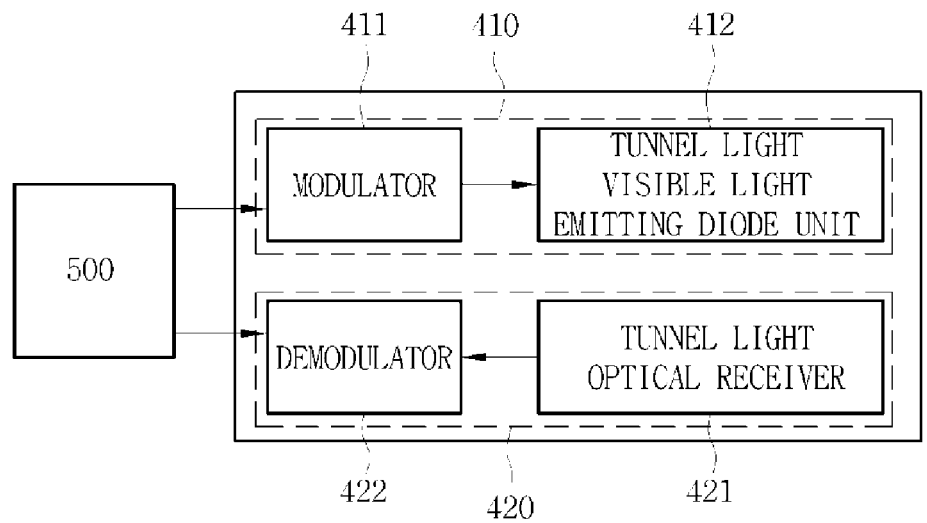
FIG. 4B is a block diagram of a tunnel light apparatus of FIG. 4A.
Figure 4C:
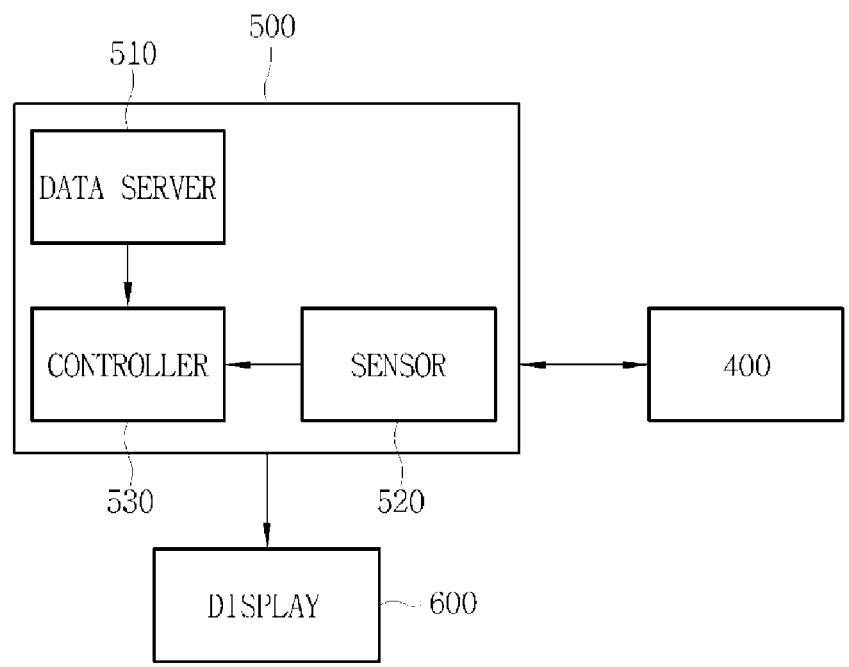
FIG. 4C is a block diagram of a tunnel light control apparatus of FIG. 4A.

FIG. 4A is a block diagram of a vehicular communication system in the tunnel using the visible light communication according to an exemplary embodiment of the present invention, FIG. 4B is a block diagram of the tunnel light apparatus of FIG. 4A, and FIG. 4C is a block diagram of the tunnel light control apparatus of FIG. 4A.

The vehicular communication system in the tunnel using the visible light communication of FIG. 4A includes a tunnel light apparatus 400 for communicating with the vehicle using the visible light when the vehicle including the vehicular visible light communication apparatus of FIG. 1A enters the tunnel, and a tunnel light control apparatus 500.

The tunnel light apparatus 400 can arrange a transmit tunnel light 410 and a receive tunnel light 420 in different lines (see 310 and 230 of FIG. 2C) to avoid signal interference.

The tunnel light control apparatus 500 assigns the light node IDs to the plurality of the tunnel lights; that is, to the transmit tunnel light 410 and the receive tunnel light 420, and receives the vehicle speed and location information sent from the vehicle to the receive tunnel light 420. Using the received vehicle speed and location information, the tunnel light control apparatus 500 controls the transmit tunnel light 410 to send the vehicle speed and location information to the front or rear vehicle.

The tunnel light apparatus 400 and the tunnel light control apparatus 500 can be connected over a wired network or a wireless network to send and receive data.

The transmit tunnel light 410 of FIG. 4B modulates the data received from the tunnel light control apparatus 500 using the various modulation schemes, and sends the modulated data to a visible light emitting diode unit 412. The tunnel light visible light emitting diode unit 412 includes one or more LEDs for converting the electric signal to the visible light signal and sending the visible light signal. The tunnel light visible light emitting diode unit 412 operates as the light when not sending the data, whereas the tunnel light visible light emitting diode unit 412 serves as the LED communication means when sending the modulated signal.

The tunnel light optical receiver 421 receives the visible light signal from the LED of the vehicular visible light communication apparatus, converts the visible light signal to an electric signal, and outputs the electric signal to a demodulator 422. For doing so, the tunnel light optical receiver 421 can be implemented using an photoelectric conversion element, such as photo-diode, mostly used to detect an optical signal by generating current corresponding to the received optical signal.

The demodulator 422 demodulates the converted electric signal according to the various demodulation schemes, and sends the demodulated data to the tunnel light control apparatus 500. The various demodulation schemes are the same as the modulation scheme used by the modulator of the vehicular visible light communication apparatus. For example, any one of the OOK, the PWM, the PPM, the PAM, the ASK, the M-PSK, and the M-QAM is used for the demodulation.

The tunnel light control apparatus 500 of FIG. 4C includes a data server 510, a sensor 520, and a controller 530.

The data server 510 receives from the tunnel light apparatus 400 and stores the data including the vehicle speed and the location information in the tunnel. The data server 510 stores the tunnel light node ID, the front passing vehicle node ID, the vehicle node ID, and the tunnel environment data.

The sensor 520 detects smoke, humidity, and temperature inside or outside the tunnel and thus generates the tunnel environment data.

The controller 530 sends the data stored to the data server 510 and the tunnel environment data provided from the sensor 520, to the tunnel light apparatus 400. The controller 530 assigns the light node ID to each tunnel light apparatus 400, acquires the traffic and the speed of the vehicles in the tunnel based on the vehicle speed and location information sent from the vehicles and the tunnel environment data in the tunnel, and transmits the acquired information to the vehicle corresponding to the vehicle node ID through the tunnel light apparatus 400.

When the tunnel environment undergoes a considerable change based on the information of the temperature, the humidity, and the smoke inside and outside the tunnel detected and sent from the sensor 520, the controller 530 determines an event and sends the disaster warning to the vehicles in the tunnel through the tunnel light apparatus 400. The vehicle receiving the disaster warning displays the disaster warning in a display, for example, in a navigation device so that the vehicle user can activate the disaster prevention system of the vehicle.

Meanwhile, the vehicular communication system in the tunnel using the visible light communication can further include a display installed to the tunnel entrance or exit for displaying the tunnel environment data. The display can provide the vehicle entering the tunnel with the traffic or the car accident information in the tunnel, and provide the vehicle exiting the tunnel with road environment information outside the tunnel.

FIG. 5 is a flowchart of a vehicular communication method in the tunnel using the vehicular visible light communication apparatus according to an exemplary embodiment of the present invention.

When the vehicle enters the tunnel, the vehicle optical receiver of the vehicular visible light communication apparatus receives the visible light signal including the tunnel light node ID, the vehicle node ID of the front passing vehicle, and the tunnel environment data from the tunnel light, and converts the visible light signal to the electric signal (S110).

When an event such as car accident does not take place, the method collects the tunnel light node IDs by demodulating the electric signal (S130), and concurrently sends its vehicle node ID to the tunnel light.

The node counter calculates the vehicle speed and location by counting the tunnel light nodes received from the tunnel light when the vehicle passes through the channel (S140).

When the tunnel entering the tunnel receives the front passing vehicle node ID from the tunnel light, the speed and the location of the front passing vehicle are calculated by collecting the front passing vehicle node ID from the demodulated signal (S150), in the same manner as the vehicle and location calculation. The calculated speed and location information is converted to the visible light signal and sent to the tunnel light (S160).

When the event occurs, the disaster warning broadcast from the tunnel light apparatus is received (S170) and displayed in the display, for example, in the navigation device in the vehicle.

Figure 6:
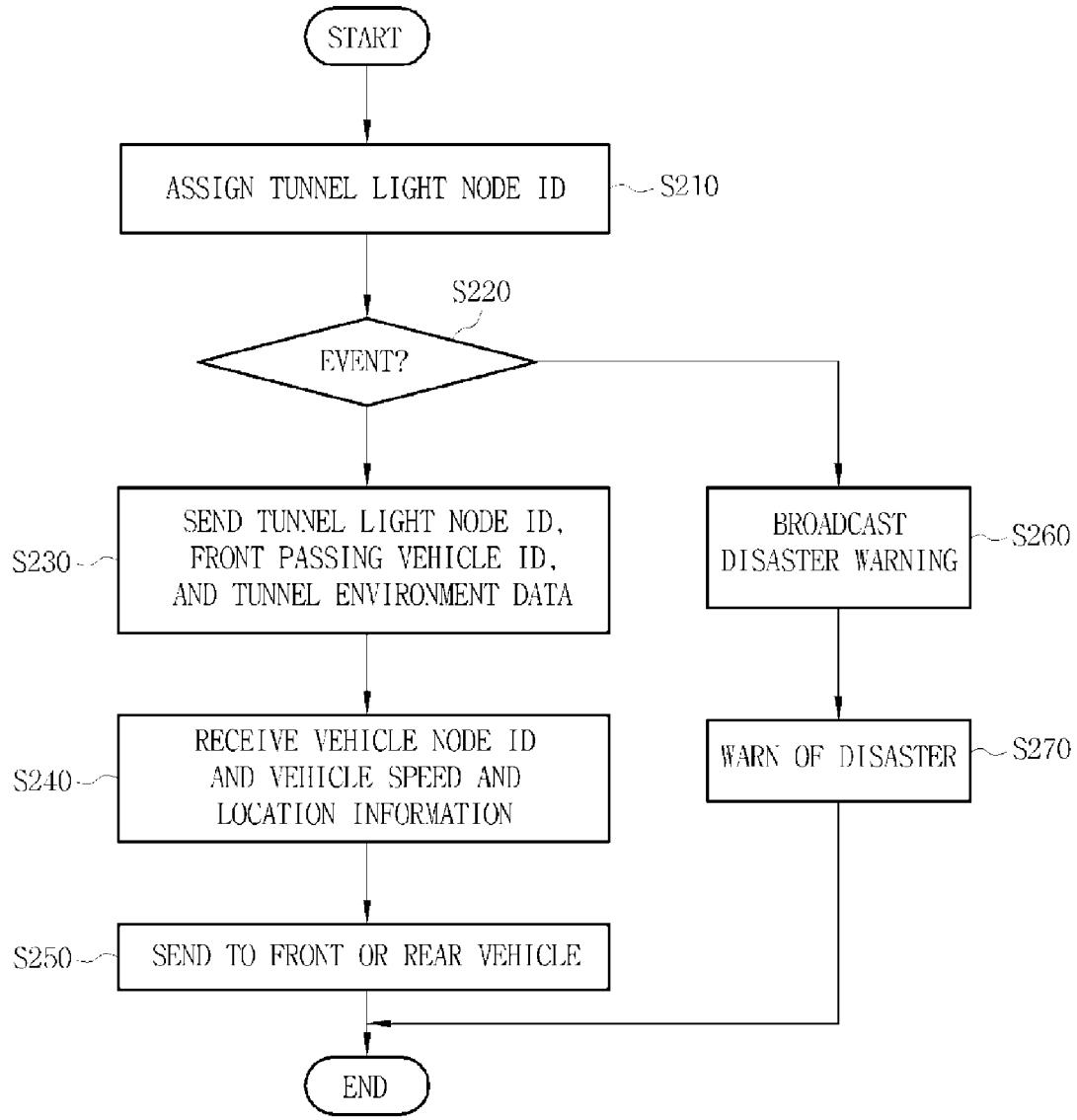
FIG. 6 is a flowchart of a vehicular communication method in the tunnel using the visible light communication according to another exemplary embodiment of the present invention.

FIG. 6 is a flowchart of a vehicular communication method in the tunnel using the visible light communication according to another exemplary embodiment of the present invention.

Before the vehicle enters the tunnel, the tunnel light is assigned the ID for identifying the tunnel light; that is, the tunnel light node ID, from the tunnel light control apparatus (S210). The method checks for any event such as car accident in the tunnel, displayed in the display installed at the tunnel entrance (S220). When there occurs no event, the visible light communication is conducted between the tunnel light and the vehicular visible light communication apparatus.

When the event takes place, the tunnel light apparatus broadcasts the disaster warning to the vehicles in the tunnel (S260) and displays the disaster warning in the display installed inside or outside the tunnel (S270) so as to provide the vehicle entering or exiting the tunnel with the traffic and the car accident information in the tunnel.

When there occurs no event, the tunnel light apparatus converts the visible light signal including the tunnel light node ID, the front passing vehicle node ID when a vehicle in the front passes through the tunnel, and the tunnel environment data, to the electric signal, and sends the electric signal to the vehicle including the vehicular visible light communication apparatus (S230).

The receive tunnel light (see FIG. 4A) receives the vehicle node ID and the vehicle speed and location information calculated by the vehicular visible light communication apparatus, from the vehicle passing through the tunnel (S240).

When the received vehicle speed and location information is transmitted to the tunnel light control apparatus, the tunnel light control apparatus sends the calculated speed and location information to the front or rear vehicle via the transmit tunnel light (see FIG. 4A) using the visible light communication (S250). By virtue of the nearby vehicle speed and location information in the tunnel, the car accident in the tunnel can be prevented in advance.

As set forth above, by use of the visible light communication without interference, the vehicular communication in the tunnel can be maintained.

The car accident in the tunnel can be prevented in advance by interworking with the disaster and accident prevention system through the visible light communication.

The car traffic in the tunnel can be managed using the tunnel light control apparatus.

Further, since the tunnel light is implemented using the LED, the vehicle speed and location information in the tunnel can be provided using the visible light communication, rather than a GPS.

Although the present disclosure has been described with an exemplary embodiment, various changes and modifications may be suggested to one skilled in the art. It is intended that the present disclosure encompass such changes and modifications as fall within the scope of the appended claims.

FIG. 1A
120 VEHICULAR VISIBLE LIGHT EMITTING DIODE UNIT
110 VEHICLE OPTICAL RECEIVER
FIG. 3
110 VEHICLE OPTICAL RECEIVER
130 DEMODULATOR
140 NODE COUNTER
150 ERROR CORRECTOR
170 DISPLAY
160 MODULATOR
120 VEHICULAR VISIBLE LIGHT EMITTING DIODE UNIT
FIG. 4A
500 TUNNEL LIGHT CONTROL APPARATUS
410 TRANSMIT TUNNEL LIGHT
420 RECEIVE TUNNEL LIGHT
FIG. 4B
411 MODULATOR
412 TUNNEL LIGHT VISIBLE LIGHT EMITTING DIODE UNIT
421 TUNNEL LIGHT OPTICAL RECEIVER
422 DEMODULATOR
FIG. 4C
510 DATA SERVER
530 CONTROLLER
520 SENSOR
600 DISPLAY
FIG. 5
START
S110 CONVERT VISIBLE LIGHT SIGNAL INCLUDING TUNNEL LIGHT NODE ID, FRONT PASSING VEHICLE ID, AND TUNNEL ENVIRONMENT DATA TO ELECTRIC SIGNAL
S120 EVENT?
S130 COLLECT TUNNEL LIGHT NODE IDS
S140 CALCULATE SPEED AND LOCATION
S150 CALCULATE SPEED AND LOCATION OF FRONT VEHICLE
S160 SEND VEHICLE SPEED AND LOCATION INFORMATION TO TUNNEL LIGHT
S170 RECEIVE DISASTER WARNING
END
FIG. 6
START
S210 ASSIGN TUNNEL LIGHT NODE ID
S220 EVENT?
S230 SEND TUNNEL LIGHT NODE ID, FRONT PASSING VEHICLE ID, AND TUNNEL ENVIRONMENT DATA
S240 RECEIVE VEHICLE NODE ID AND VEHICLE SPEED AND LOCATION INFORMATION
S250 SEND TO FRONT OR REAR VEHICLE
S260 BROADCAST DISASTER WARNING
S270 WARN OF DISASTER
END

What is claimed is:

1. A visible light communication apparatus for a vehicle, comprising:
a vehicle optical receiver for receiving a visible light signal comprising a tunnel light node ID, a front passing vehicle node ID, and tunnel environment data, from a tunnel light and converting the visible light signal to an electric signal; and
a vehicular visible light emitting diode unit arranged to face the optical receiver for converting vehicle speed and location information calculated by counting tunnel light node IDs received over a certain time, to a visible light signal and sending the visible light signal to the tunnel light.

2. The visible light communication apparatus of claim 1, wherein the tunnel environment data comprises weather condition information comprising a humidity and a temperature in the tunnel, and disaster information and car accident information inside or outside the tunnel.

3. The visible light communication apparatus of claim 1, wherein the vehicle optical receiver and the vehicular visible light emitting diode unit are installed in a side or an upper side of the vehicle to correspond to arrangement of the tunnel light.

4. The visible light communication apparatus of claim 1, further comprising:
   a demodulator for demodulating the electric signal converted at the vehicle optical receiver;
   a node counter for collecting the tunnel light node IDs from the demodulator and calculating the vehicle speed and location by counting the received tunnel light node IDs;
   an error corrector for correcting the vehicle speed and location affected by error of the tunnel light; and
   a modulator for modulating the vehicle speed and location information to the visible light signal to send the visible light signal.

5. The visible light communication apparatus of claim 4, wherein the node counter collects the front passing vehicle node ID from the demodulator and calculates front passing vehicle speed and location by counting the received tunnel light node IDs.

6. The visible light communication apparatus of claim 1, further comprising:
   a display for displaying the vehicle speed and the location and the tunnel environment data.

7. The visible light communication apparatus of claim 6, wherein the display is a navigation device.

8. The visible light communication apparatus of claim 1, wherein the vehicle optical receiver comprises a plurality of photo-detector arrays spaced apart by a certain distance and arranged in a row, and visible light emitting diodes of the vehicular visible light emitting diode unit are arranged in a row facing the photo-detectors.

9. The visible light communication apparatus of claim 1, wherein, when there exists an event comprising a car accident inside or outside the tunnel according to the tunnel environment data, a disaster warning is received from the tunnel light.

10. A vehicular communication system in a tunnel using visible light communication, comprising:
    a tunnel light apparatus comprising a transmit tunnel light which sends a tunnel light node ID, a front passing vehicle node ID, and tunnel environment data to a vehicular visible light communication apparatus installed to a vehicle entering the tunnel using the visible light communication, and a receive tunnel light which receives a vehicle node ID and vehicle speed and location information from the vehicular visible light communication apparatus;
    a tunnel light control apparatus for assigning an ID corresponding to the tunnel light, receiving the vehicle speed and location information from the receive tunnel light, and sending the vehicle speed and location information to the transmit tunnel light; and
    wherein the vehicle speed and location information is calculated by counting tunnel light node IDs received over a certain time.

11. The vehicular communication system of claim 10, wherein the tunnel environment data comprises weather condition information comprising a humidity and a temperature in the tunnel, and disaster information and car accident information inside or outside the tunnel.

12. The vehicular communication system of claim 10, wherein the transmit tunnel light comprises:
    a modulator for modulating the tunnel light node ID, the front passing vehicle node ID, and the tunnel environment data to send a visible light signal; and
    a tunnel light visible light emitting diode unit for converting the modulated tunnel light node ID, front passing vehicle node ID, and tunnel environment data to a visible light signal and sending the visible light signal to the vehicular visible light communication apparatus.

13. The vehicular communication system of claim 10, wherein the receive tunnel light comprises:
    a tunnel light optical receiver for receiving a visible light signal comprising a vehicle ID from the vehicle and converting the visible light signal to an electric signal; and
    a demodulator for demodulating the electric signal converted at the optical receiver.

14. The vehicular communication system of claim 12 or claim 13, wherein the tunnel light optical receiver comprises a plurality of photo-detector arrays spaced apart by a certain distance and arranged in a row, and visible light emitting diodes of the vehicular visible light emitting diode unit are arranged in a row facing the photo-detectors.

15. The vehicular communication system of claim 10, wherein the tunnel light control apparatus comprises:
    a data server for storing the tunnel light node ID, the front passing vehicle node ID, and the tunnel environment data; and
    a controller for controlling to send the data stored to the data server to the vehicular visible light communication apparatus using the tunnel light.

16. The vehicular communication system of claim 15, further comprising:
    a sensor for generating the tunnel environment data by detecting smoke, humidity, and temperature inside and outside the tunnel.

17. The vehicular communication system of claim 10, further comprising:
    a display installed at a tunnel entrance or exit for displaying the tunnel environment data.

18. A vehicular communication method in a tunnel using visible light communication, comprising:
    receiving a visible light signal comprising a tunnel light node ID, a front passing vehicle node ID, and tunnel environment data from a tunnel light and converting the visible light signal to an electric signal;
    collecting the tunnel light node IDs by demodulating the electric signal;
    calculating vehicle speed and location by counting the received tunnel light node IDs; and
    converting the calculated vehicle speed and location information to a visible light signal and sending the visible light signal to the tunnel light.

19. The vehicular communication method of claim 18, wherein the calculating of the vehicle speed and location comprises:
    collecting the front passing vehicle node ID from the demodulated signal and calculating speed and location of the front passing vehicle by counting the tunnel light node IDs received over a certain time.

20. The vehicular communication method of claim 18, wherein the collecting of the tunnel light node IDs comprises:
    sending the vehicle node ID to the tunnel light.

21. The vehicular communication method of claim 18, further comprising:

when there exists an event comprising a car accident inside or outside the tunnel according to the tunnel environment data, receiving a disaster warning from the tunnel light.

22. A vehicular communication method in a tunnel using visible light communication, comprising:
- assigning tunnel light node IDs to tunnel lights;
- determining whether there exists an event comprising a car accident occurring inside or outside the tunnel, based on tunnel environment data;
- when there is no event according to the determination, sending a tunnel light node ID, a front passing vehicle node ID, and the tunnel environment data to a vehicular visible light communication apparatus of a vehicle which enters the tunnel using the visible light communication;
- receiving a vehicle node ID and vehicle speed and location information from the vehicular visible light communication apparatus;
- sending the vehicle speed and location information to a vehicular visible light communication apparatus of a front vehicle or a rear vehicle using the visible light communication; and
- calculating vehicle speed and location by counting the received tunnel light node IDs.

23. The vehicular communication method of claim 22, wherein the receiving of the vehicle node ID and the vehicle speed and location information from the vehicular visible light communication apparatus comprises:
- sending the vehicle node ID and the vehicle speed and location information received at a receive tunnel light, to a tunnel light control apparatus; and
- sending the vehicle node ID and the vehicle speed and location information to a transmit tunnel light.

24. The vehicular communication method of claim 22, further comprising, when the event exists:
- aborting communication between the tunnel light and a vehicle in the tunnel and broadcasting a disaster warning to a visible light communication apparatus of the vehicle; and
- informing of the event taking place inside and outside the tunnel by controlling to turn on and off the tunnel light or by displaying the event in a display installed at a tunnel entrance or exit.

* * * * *